United States Patent [19]

Bahler

[11] Patent Number: 4,782,577
[45] Date of Patent: Nov. 8, 1988

[54] METHOD OF USING V-CLAMP INSTALLATION TOOL

[75] Inventor: David C. Bahler, Riverside, Calif.

[73] Assignee: General Dynamics Corporation, Pomona, Calif.

[21] Appl. No.: 130,917

[22] Filed: Dec. 10, 1987

[51] Int. Cl.$^4$ .................. B23P 19/00; B23P 19/04
[52] U.S. Cl. .................. 29/525.1; 29/237; 24/278; 24/280; 269/232; 285/367
[58] Field of Search .......... 29/526 R, 237, 257; 24/278, 280; 269/230, 231, 232; 285/236, 253, 367

[56] References Cited

U.S. PATENT DOCUMENTS

| 601,370 | 3/1898 | Cohalan | 24/278 |
|---|---|---|---|
| 732,757 | 7/1903 | Long | 269/132 |
| 1,300,864 | 4/1919 | Palmer-Jones | 24/278 |
| 1,412,187 | 4/1922 | Lopdell | 24/279 |
| 1,782,476 | 11/1930 | Parker | 29/257 X |
| 1,940,910 | 12/1933 | Hickey | 269/130 X |
| 2,247,642 | 7/1941 | Neville | 24/278 X |
| 2,391,804 | 12/1945 | Smith | 24/278 |
| 2,427,353 | 9/1947 | Gagesteyn | 269/132 X |
| 2,585,343 | 2/1952 | Newlon, Jr. | 269/131 |
| 2,702,716 | 2/1955 | Basolo et al. | 24/278 X |
| 3,061,339 | 10/1962 | Jewell | 24/278 X |
| 3,123,426 | 3/1964 | Leto et al. | 24/278 |
| 3,172,384 | 3/1965 | Tipton | 29/237 X |
| 3,353,145 | 11/1967 | Sodderland et al. | 24/278 X |
| 3,388,438 | 6/1968 | Tetzlaff | 24/278 |
| 3,512,229 | 5/1970 | Phariss | 24/280 |
| 3,722,038 | 3/1973 | Arntz et al. | 29/282 |
| 3,898,714 | 8/1975 | McFadden | 29/282 |
| 4,057,082 | 11/1977 | King | 24/278 X |
| 4,173,816 | 11/1979 | Meckstroth et al. | 29/526 R |

FOREIGN PATENT DOCUMENTS

| 406317 | 11/1943 | Italy | 285/253 |
|---|---|---|---|
| 129621 | 12/1959 | U.S.S.R. | 269/132 |

Primary Examiner—Charlie T. Moon
Attorney, Agent, or Firm—Neil F. Martin; Angus C. Fox

[57] ABSTRACT

An apparatus for seating and tightening clamps around joints between tubular sections comprises an elongate flexible member such as a chain for extending around a clamp positioned over a joint, the member having rollers spaced along its length, and a tightening device for applying tension to the member to tighten it around the clamp so that the rollers roll around the surface of the clamp and apply a radial force to the clamp.

1 Claim, 2 Drawing Sheets

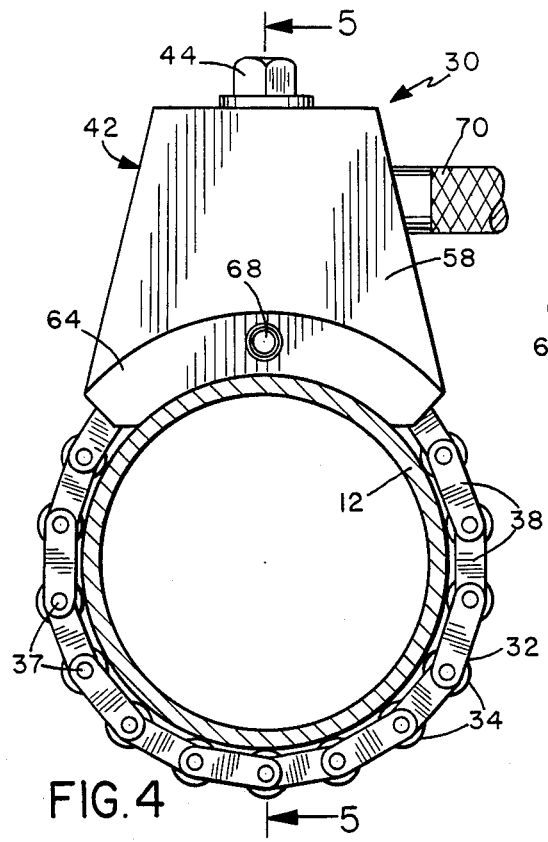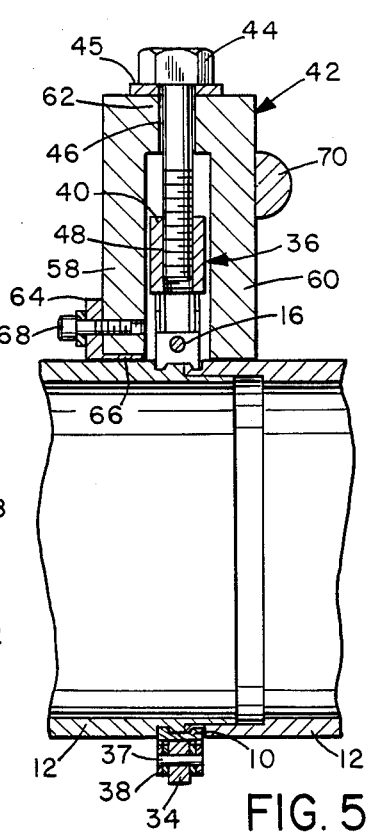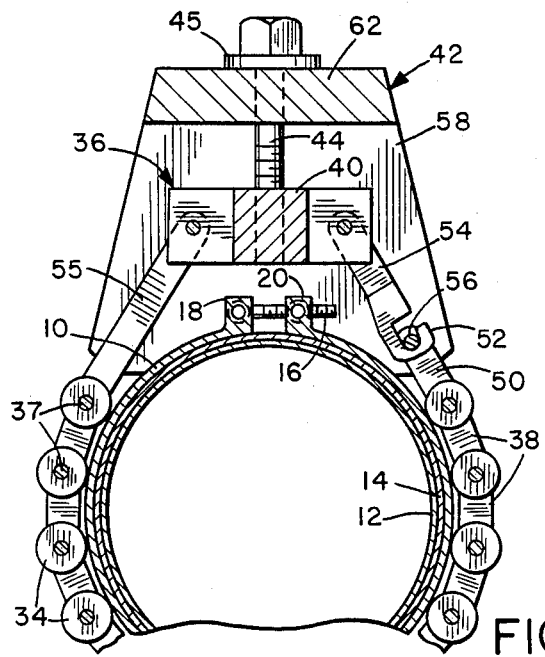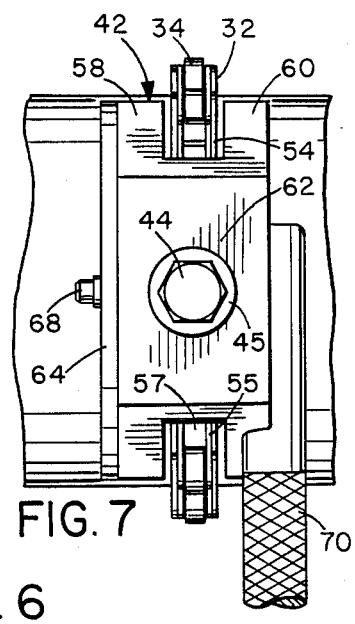

METHOD OF USING V-CLAMP INSTALLATION TOOL

The government has rights to this invention pursuant to Contract No. N00024-79-C-5202.

BACKGROUND OF THE INVENTION

The present invention relates to an apparatus or tool for seating and tightening clamps around joints between tubular sections, for example between adjacent missile sections, on pumps, motors, or on pipeline sections.

Clamps for joining two adjacent tubular sections are generally known as V-clamps and generally consist of a V-section ring or sleeve which extends over the joint and has a tightening bolt for tightening the clamp over the joint. Presently, such clamps are tightened by tapping the ring with a mallet and then tightening the clamp bolt, repeating the procedure until the clamp bolt shows no sign of movement. This tapping induces shock and vibration into the item being joined and also reduces the life of the clamp ring. This method also does not achieve an evenly distributed load around the V-clamp as it is tightened, so that the clamp may not be seated uniformly.

SUMMARY OF THE INVENTION

It is an object of this invention to provide a tool which can statically seat V-clamps.

According to the present invention an apparatus for seating and tightening V-clamps around joints is provided, which comprises an elongate flexible member with a plurality of rollers spaced along its length for extending around a V-clamp positioned over a joint, and a tightening device for tightening the member around the clamp. The rollers are positioned to roll around the surface of the clamp as the member is tightened, thus applying cosine loading and creating axially directed forces to the clamp during tightening. The elongate member preferably comprises a chain with rollers arranged at the joints between adjacent chain links.

Preferably, a spacer device is provided for supporing the tightening device above a V-clamp bolt. The spacer device is designed to be seated adjacent a joint and extends over a V-clamp on the joint to support the tightening device. In a preferred embodiment of the invention, the spacer device comprises a saddle member having a pair of legs for seating on the tubular sections on each side of a joint, and a saddle portion for straddling the joint above a V-clamp bolt. The tightening device is adjustably mounted on the saddle portion above the joint, and is pivotally secured to opposite ends of the elongate member to tighten the member around the clamp.

According to another aspect of the present invention a method of installing a V-clamp around a joint is provided, which comprises the steps of positioning a V-clamp around the joint with its adjusting bolt positioned at the top of the joint, tightening the bolt to maintain orientation around the joint, seating the installation tool over the Vclamp bolt and passing the elongate member around the clamp so that it is centered over it, connecting the free end of the member to the tightening device, and repeatedly tightening the member and then tightening the V-clamp bolt until no further tightening is possible. The tool is then removed from the V-clamp.

BRIEF DESCRIPTION OF THE PREFERRED EMBODIMENT

This present invention will be better understood from the following detailed description of a preferred embodiment of the invention, taken in conjunction with the accompanying drawings, in which like reference numerals refer to like parts, and in which:

FIG. 4 is a sectional view taken on the line 4—4 of FIG. 3;

FIG. 5 is a sectional view taken on the line 5—5 of FIG. 4;

FIG. 6 is a sectional view taken on the line 6—6 of FIG. 3; and

FIG. 7 is a top plan view of the structure of FIG. 3.

DESCRIPTION OF THE PREFERRED EMBODIMENT

Figure 1:
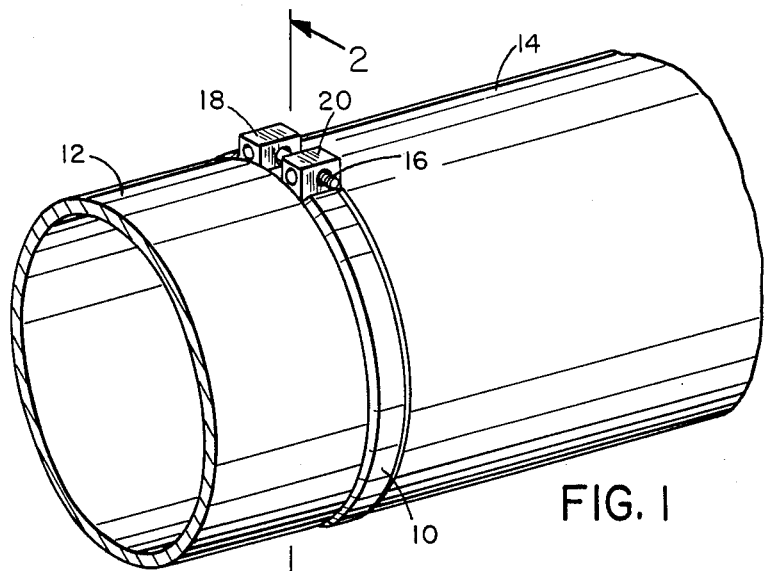
FIG. 1 is a perspective view of a typical V-clamp joint.
Figure 2:
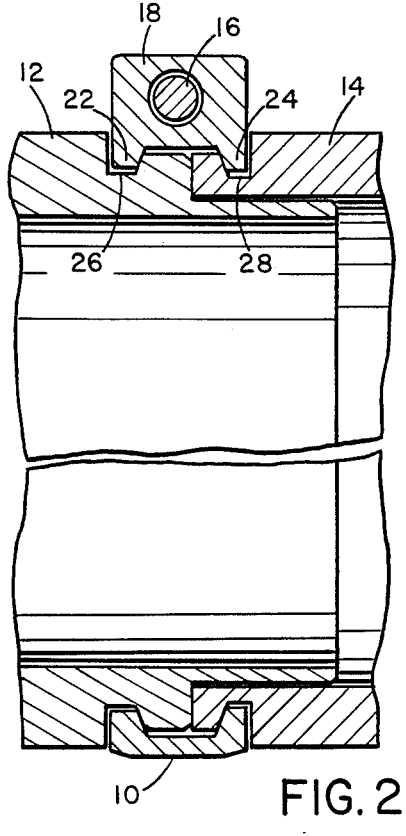
FIG. 2 is an enlarged sectional view taken on line 2—2 of FIG. 1.
Figure 3:
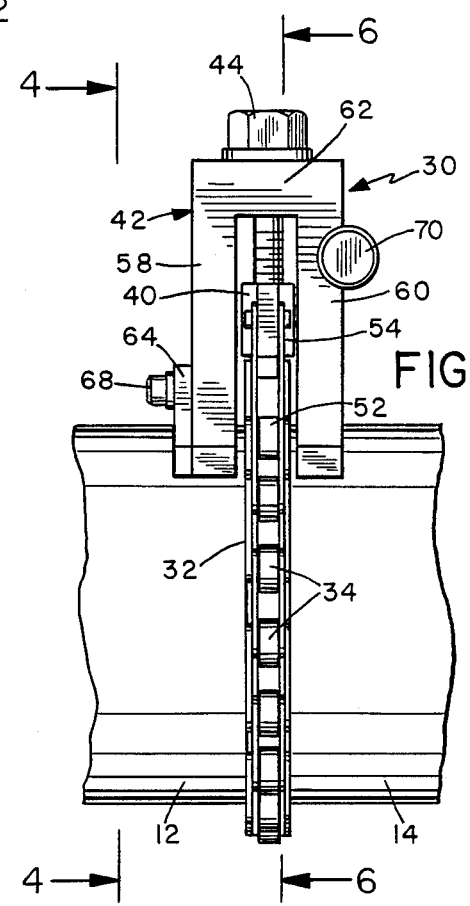
FIG. 3 is a side elevation view of the installation tool mounted on the V-clamp joint.

FIGS. 1 and 2 of the drawings show a typical V-clamp 10 joining two adjacent tubular sections 12 and 14 arranged end to end. The ends of the tubular sections normally overlap as shown in FIG. 2. The V-clamp comprises a ring or sleeve which extends around the joint and has a tightening bolt 16 which extends through blocks 18, 20 at adjacent ends of the clamp ring to tighten the clamp around the joint. As shown in FIG. 2, the V clamp has annular V-rims 22, 24 which project into annular grooves 26, 28 provided adjacent the end of each tubular section 12, 14, respectively. V-clamp joints of this type are used, for example, between adjacent tubular missile sections, fuel tanks, on pumps, motors, and on pipeline sections, as well as in many other areas.

The typical V-clamp shown in FIGS. 1 and 2 is normally tightened around the joint by first tightening the bolt 16, then tapping the ring or sleeve with a mallet, and retightening the bolt. This procedure is repeated until the clamp bolt shows no sign of movement. This technique has the disadvantage that the clamp is not evenly tightened around the joint and may not be seated uniformly. Also, the tapping induces shock and vibration into the tubular sections at the joint and also can reduce the lifetime of the V-clamp ring itself.

FIGS. 3 to 7 of the drawings show an installation tool 30 according to a preferred embodiment of the present invention for installing a V-clamp of the type shown in FIGS. 1 and 2 on a joint. The tool 30 basically comprises a chain or other elongate flexible member 32 having a plurality of rollers 34 spaced along its length, and a tightening device 36 to which opposite ends of the chain 32 are secured for tightening the chain around a V-clamp. The tightening device 36 is spaced above the V-clamp bolt by means of a saddle member 42 which adjustably supports it above the bolt, as explained in more detail below. The rollers are rotatably mounted on pivot pins 37 securing the adjacent ends of successive chain links 38, as best shown in FIG. 5.

The tightening device basically comprises a nut member 40 to which opposite ends of the chain are pivotally secured, as shown in FIG. 6, and a tightening screw 44 which extends through a bore 46 in the central portion of the saddle member and into a screw threaded bore 48 in the center of nut member 40 to suspend it from the saddle member 42. A bushing 45 is mounted between the head of screw 44 and the outer surface of saddle member 42.

The link 50 at one end of the chain is releasably secured to the nut member 40 via a quick release hook 52 at the end of link 54 which is pivotally secured to member 40. Hook 52 engages over the pivot pin 56 at the end of link 50. The link 55 at the opposite end of the chain is specially modified to allow access of a hex-drive or similar device for tightening the V-clamp bolt when the tool is positioned over the bolt as showon in FIGS. 5 and 6. Link 55 is lengthened and formed in two half links with a gap 57 between the links to allow access to the hex drive.

The saddle member 42 is arranged to straddle the joint and center the roller chain on the joint. The member 42 has a pair of plate-like legs 58,60 having arcuate cut-outs for seating on the adjacent ends of the two tubular sections as shown in FIGS. 4 to 6, and a central saddle portion 62 straddling the joint from which the adjusting or tightening device is suspended. The legs 58 and 60 are preferably of unequal length as shown in FIG. 5 to allow the saddle to be seated on adjacent tubular sections having different outer diameters. In some types of missile joints, for example, the tubular sections will have different diameters. A saddle adapter 64 is provided for extending the shorter leg 58 when the saddle is to be seated on tubular sections having the same diameter. Adapter 64 comprises an arcuate member with a projection 66 for extending into the gap between the shorter leg 58 of the saddle and the outer face of the underlying tubular section, and a bolt 68 which extends through aligned openings in adapter 64 and leg 58 to secure the adapter to the saddle. Different size adapters could be provided for various tube diameter differences, with the saddle being used with or without an adapter according to the relative diameters of the two tubular sections to be joined. In the arrangement shown in FIG. 5, the adapter effectively makes the saddle legs of equal length where the adjacent tubular sections have the same diameter.

A handle 70 projects from the saddle to aid in positioning it above a joint. The various parts of the installation tool are preferably all of metal, although other materials may be used.

In order to statically seat a V clamp using the installation tool described above, the V-clamp 10 is first positioned around the joint so that the V-clamp bolt 16 is oriented on top of the joint. The V-clamp bolt is tightened sufficiently to maintain this orientation. The tool 30 is then centered above the V-clamp bolt, using handle 70, so that the legs of the saddle 42 are seated on the adjacent end sections of the tubes to be joined with the central portion of the saddle straddling the joint above the V-clamp bolt. The saddle adapter is used if necessary.

At this point the roller chain 32 is wrapped around the joint over the V-clamp ring, and connected to the quick release hook 52 as shown in FIG. 6. The load screw 44 is tightened, raising nut member 40 and thus tightening the chain around the clamp ring. Initially screw 44 is tightened only enough to maintain its position over the V-clamp bolt, ensuring the roller chain is centered on the V-clamp ring. The load screw is then tightened to the desired torque. The V-clamp bolt is then retightened to its desired torque, using a hex-drive inserted between the saddle legs and through modified end link 55. The tightening procedure is repeated until both the load screw and the V-clamp bolt indicate no further movement. At this point the installation tool is removed by disconnecting the roller chain from the quick release hook. The V-clamp will then be fully seated over the joint.

As the load screw is being tightened, drawing up the ends of the roller chain, the rollers will roll around the circumference of the clamp ring, exerting cosine loading and creating axially directed forces on the clamp which allows the ring to be seated progressively around the circumference of the joint. As the torque on the load screw is increased, the force on each roller will be increased and thus the applied load is distributed evenly around the circumference of the clamp ring. Since the V-clamp can be fully seated statically using the installation tool, shock and vibration loads on installation are eliminated, and the clamp ring does not need to be tapped to ensure that tightening is complete.

This installation tool can be used to seat V-clamps statically around any joint, such as joints found between adjacent tubular sections on missiles, pumps, motors, and hydraulic piping installations, or anywhere where V-clamps are used in industry.

Although a preferred embodiment of the invention has been described above by way of example only, it will be understood by those skilled in the field that modifications may be made to the disclosed embodiment without departing from the scope of the invention, which is defined by the appended claims.

I claim:

1. A method of installing a V-clamp around a joint, comprising the steps of:

positioning a V-clamp around a joint with its adjusting bolt positioned at the top of the joint;

tightening the adjusting bolt to maintain orientation around the joint;

seating an installation tool over the V-clamp bolt and passing an elongate member which is secured at one end to a tightening device of the tool around the clamp so that it is centered over it, and securing the free end of the elongate member to the tightening device over the adjusting bolt on the top of the joint, the elongate member having transverse rollers spaced along its length which bear against the outer surface of the V-clamp;

repeatedly tightening the tightening device to tighten the elongate member around the V-clamp, and retightening the V-clamp bolt until no further tightening of either the tightening device or the V-clamp bolt is possible; and releasing the end of the elongate member and removing the installation tool from the V-clamp.

* * * * *